US012526305B2

(12) United States Patent
Coffey et al.

(10) Patent No.: US 12,526,305 B2
(45) Date of Patent: Jan. 13, 2026

(54) EVALUATING CRYPTOGRAPHIC API CALLS AT RUNTIME

(71) Applicant: Oracle International Corporation, Redwood Shores, CA (US)

(72) Inventors: Sean James Coffey, Dublin (IE); Sean Mullan, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 134 days.

(21) Appl. No.: 18/404,173

(22) Filed: Jan. 4, 2024

(65) Prior Publication Data

US 2025/0227123 A1 Jul. 10, 2025

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC H04L 63/1433; H04L 63/1425; G06F 21/554
See application file for complete search history.

(56) References Cited

U.S. PATENT DOCUMENTS

| | | | | |
|---|---|---|---|---|
| 10,503,904 | B1* | 12/2019 | Singh | G06F 21/566 |
| 10,558,809 | B1* | 2/2020 | Joyce | G06N 5/046 |
| 10,924,410 | B1* | 2/2021 | Nee | G06Q 10/04 |
| 2010/0275025 | A1* | 10/2010 | Parkinson | H04L 9/3247 |
| | | | | 713/176 |
| 2017/0322836 | A1* | 11/2017 | Ionescu | G06F 9/54 |
| 2021/0026961 | A1* | 1/2021 | Underwood | G06F 16/9027 |
| 2021/0099483 | A1* | 4/2021 | Shukla | G06F 21/566 |
| 2022/0156383 | A1* | 5/2022 | Schwarzbauer | G06F 21/566 |
| 2024/0061731 | A1* | 2/2024 | Huntley | G06F 9/546 |
| 2025/0055870 | A1* | 2/2025 | Viswambharan | H04L 63/08 |

OTHER PUBLICATIONS

Zeng et al., "Detecting malware and evaluating risk of app using Android permission-API system," 2014 11th International Computer Conference on Wavelet Actiev Media Technology and Information Processing(ICCWAMTIP) Year: 2014 | Conference Paper | Publisher: IEEE.*
Cheh et al., "Analyzing OpenAPI Specifications for Security Design Issues," 2021 IEEE Secure Development Conference (SecDev) Year: 2021 | Conference Paper | Publisher: IEEE.*

* cited by examiner

*Primary Examiner* — Roderick Tolentino
(74) *Attorney, Agent, or Firm* — Invoke

(57) ABSTRACT

Operations include identifying a cryptographic Application Programming Interface (API) call corresponding to a Cryptography Architecture API. A cryptographic security ruleset may be applied to match one or more rules based on attributes of a cryptographic operation identified by the cryptographic API call. The system may perform operations associated with the one or more matched rules. As an example, an operation may include generating a risk analysis metric for the cryptographic API call. The system may generate a cryptographic health report based on the risk analysis metric.

22 Claims, 8 Drawing Sheets

EVALUATING CRYPTOGRAPHIC API CALLS AT RUNTIME

TECHNICAL FIELD

The present disclosure relates to evaluating cryptographic API calls at runtime. In particular, the present disclosure relates to analyzing cryptographic API calls based on a cryptographic security ruleset.

BACKGROUND

A Cryptography Architecture Application Programming Interface (API) may provide a framework and implementation for cryptographic operations, such as encryption, digital signatures, message digests (hashing), key generation and management, secure random number generation, key agreement protocols, certificate management, and SSL/TLS functions, among other methods. At runtime, an application may make cryptographic API calls to the Cryptography Architecture API to invoke various cryptographic operations. There may be instances where the Cryptography Architecture API provides access to cryptographic operations or algorithms that are deemed unsafe according to cryptography best practices. However, applications can still make cryptographic API calls for such unsafe cryptographic operations without restriction, thereby compromising the cryptographic integrity of the applications and potentially any data that is processed by the unsafe cryptographic operations.

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
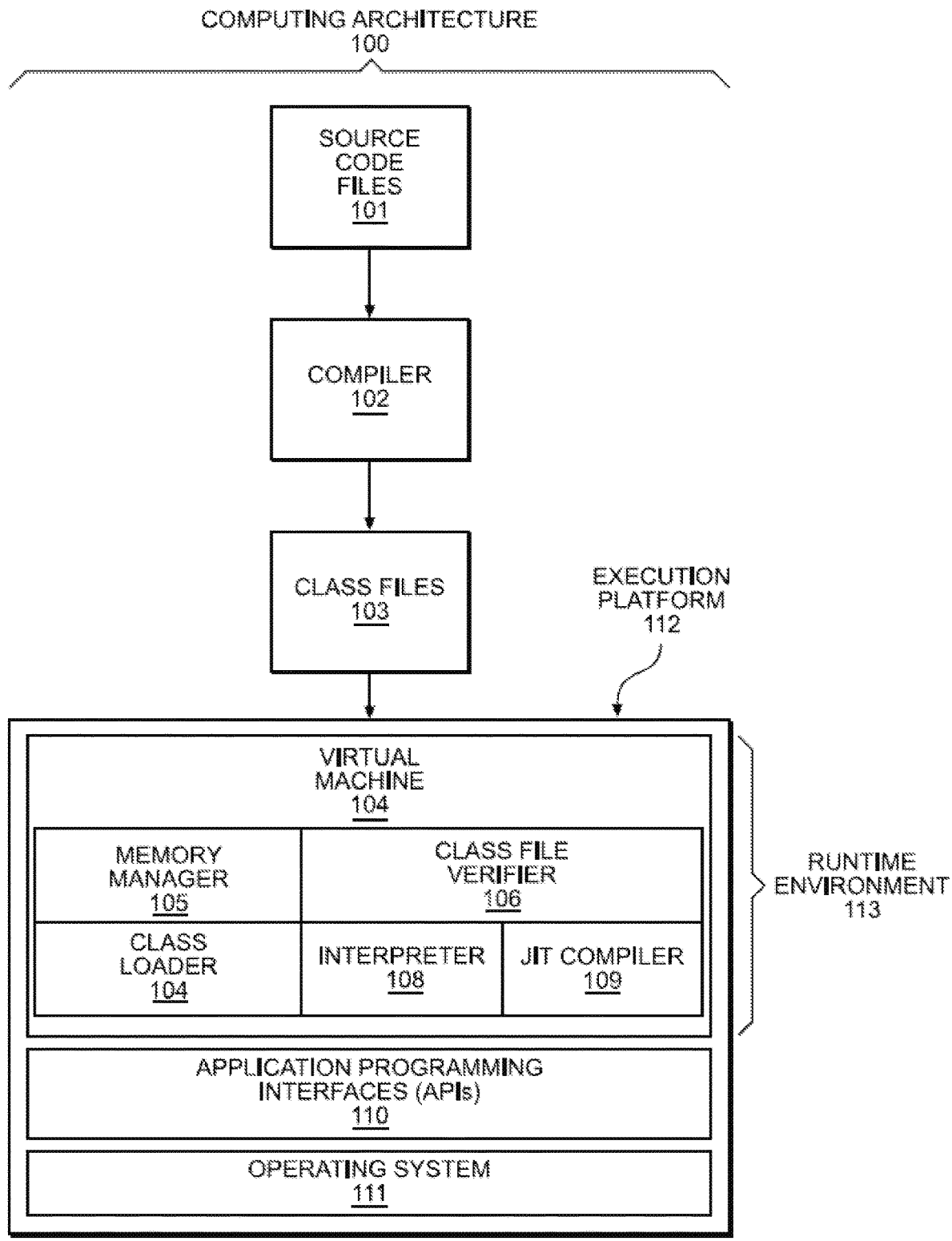
FIG. 1 illustrates an example computing architecture in which techniques described herein may be practiced.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. CRYPTOGRAPHIC ASSESSMENT SYSTEM
4. EVALUATING A CRYPTOGRAPHIC API CALL
5. MAPPING CRYPTOGRAPHIC API CALL TO A RULE
6. HARDWARE OVERVIEW
7. MISCELLANEOUS; EXTENSIONS

1. GENERAL OVERVIEW

One or more embodiments generate a cryptographic health report based on an analysis of event data associated with the cryptographic API calls. A cryptographic assessment system may monitor cryptographic application programming interface (API) calls corresponding to a Cryptographic Architecture API made by a target application at runtime. When a cryptographic API call is detected, the cryptographic assessment system may extract event data associated with the cryptographic API call. The event data may be analyzed to determine various attributes associated with the cryptographic API call, such as a type of cryptographic operation being requested, a cryptographic algorithm to use with the cryptographic operation, a provider of the cryptographic algorithm, and stack trace data corresponding to the cryptographic operation. The cryptographic assessment system may apply a cryptographic security ruleset to the attributes of the cryptographic operation to determine any matching rules. A rule may be associated with one or more operations to be performed when the rule is matched. The cryptographic assessment system may perform operations associated with any matching rules. For example, a matching rule may be associated with an operation to generate a risk analysis metric. As an example, the risk analysis metric may flag the cryptographic operation identified by cryptographic API call as a safe or unsafe cryptographic operation.

Additional cryptographic API calls may be detected by the cryptographic assessment system as the target application runs. The cryptographic assessment system may continue to extract and analyze event data associated with the cryptographic API calls to match rules and perform corresponding operations such as generating respective risk analysis metrics for cryptographic operations identified by the cryptographic API calls. The cryptographic assessment system may generate a cryptographic health report based on an analysis of event data associated with the cryptographic API calls. For example, the cryptographic health report may identify the cryptographic API calls made by the target application and their corresponding risk analysis metrics.

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
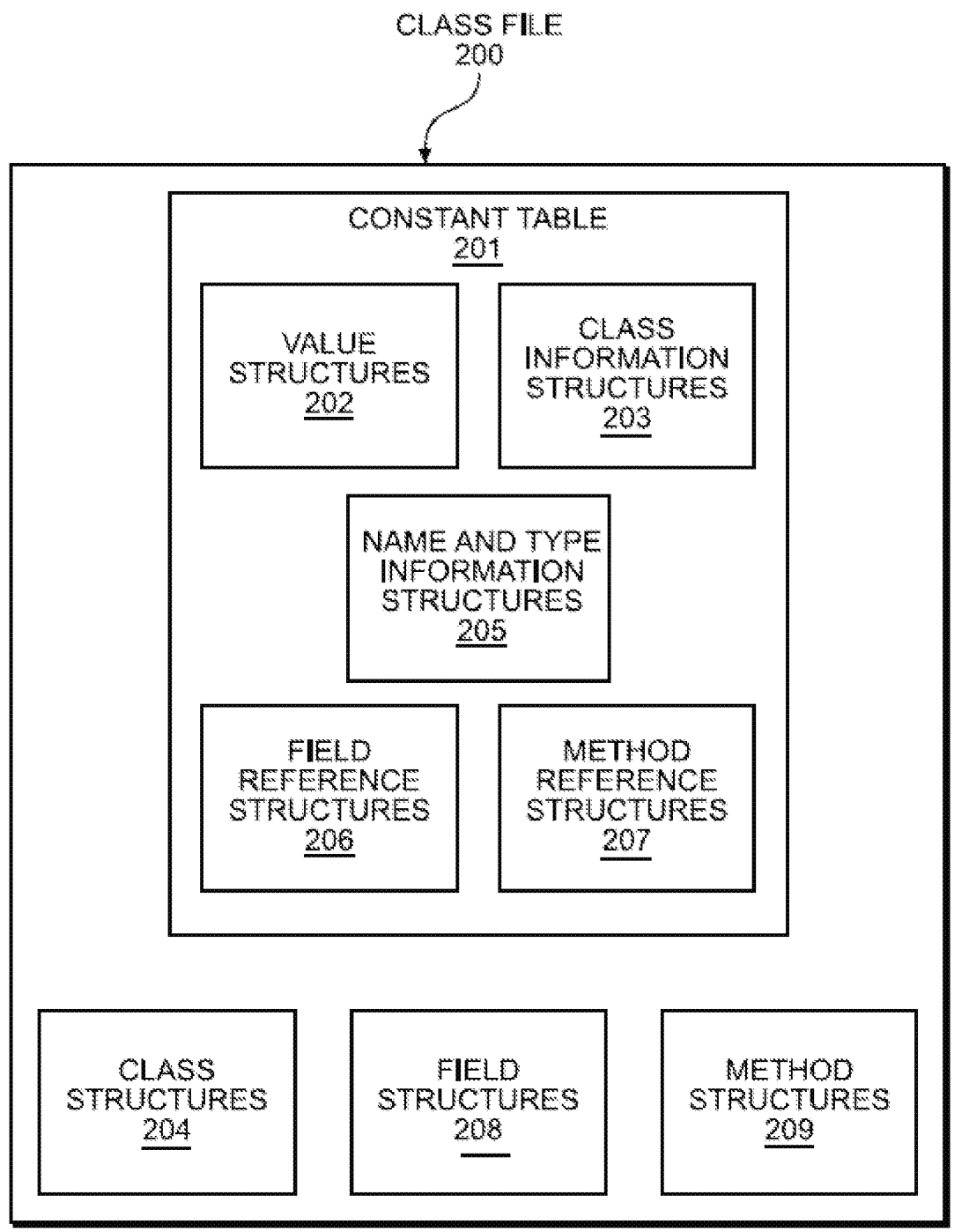
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field.

Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I) I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
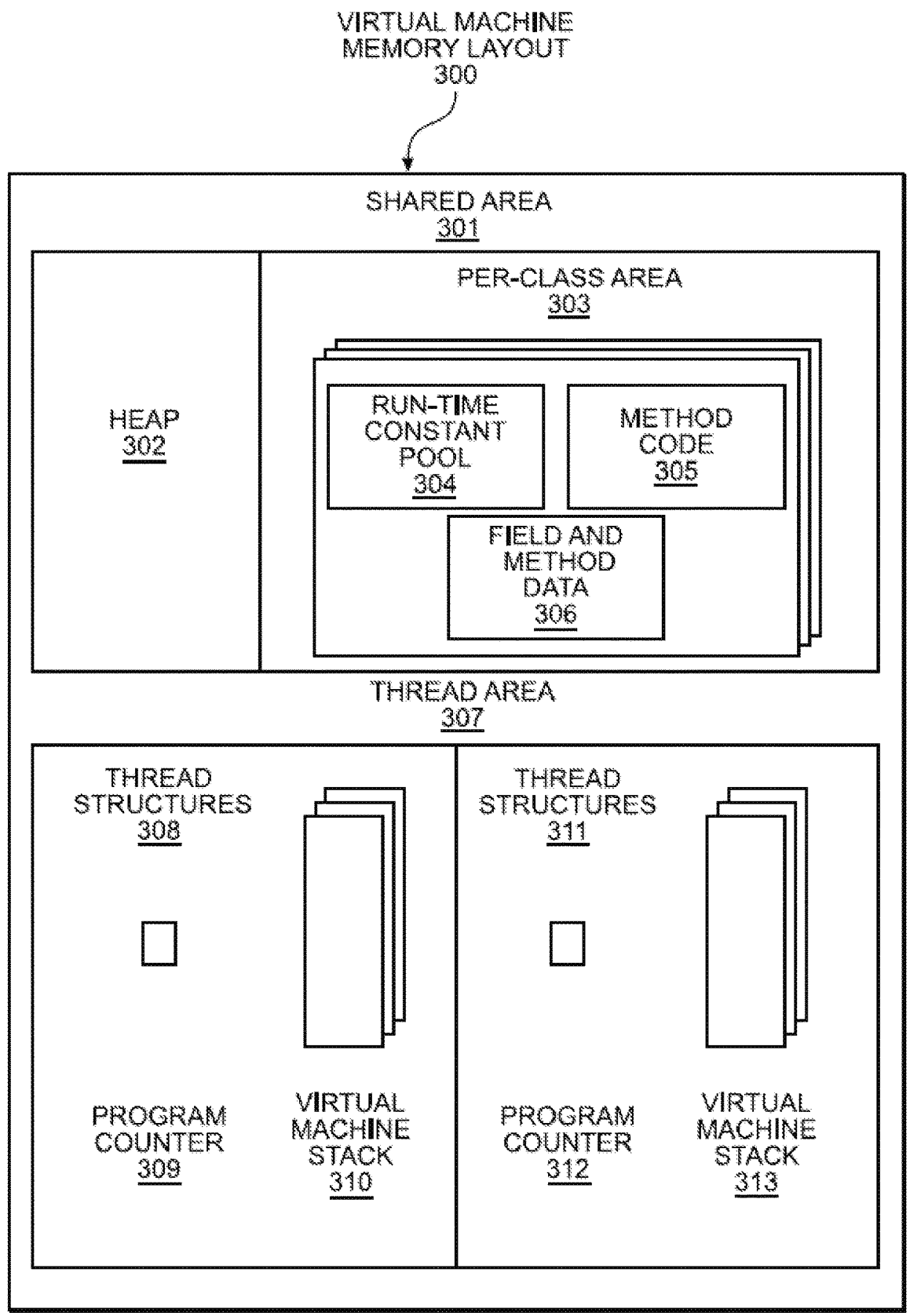
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
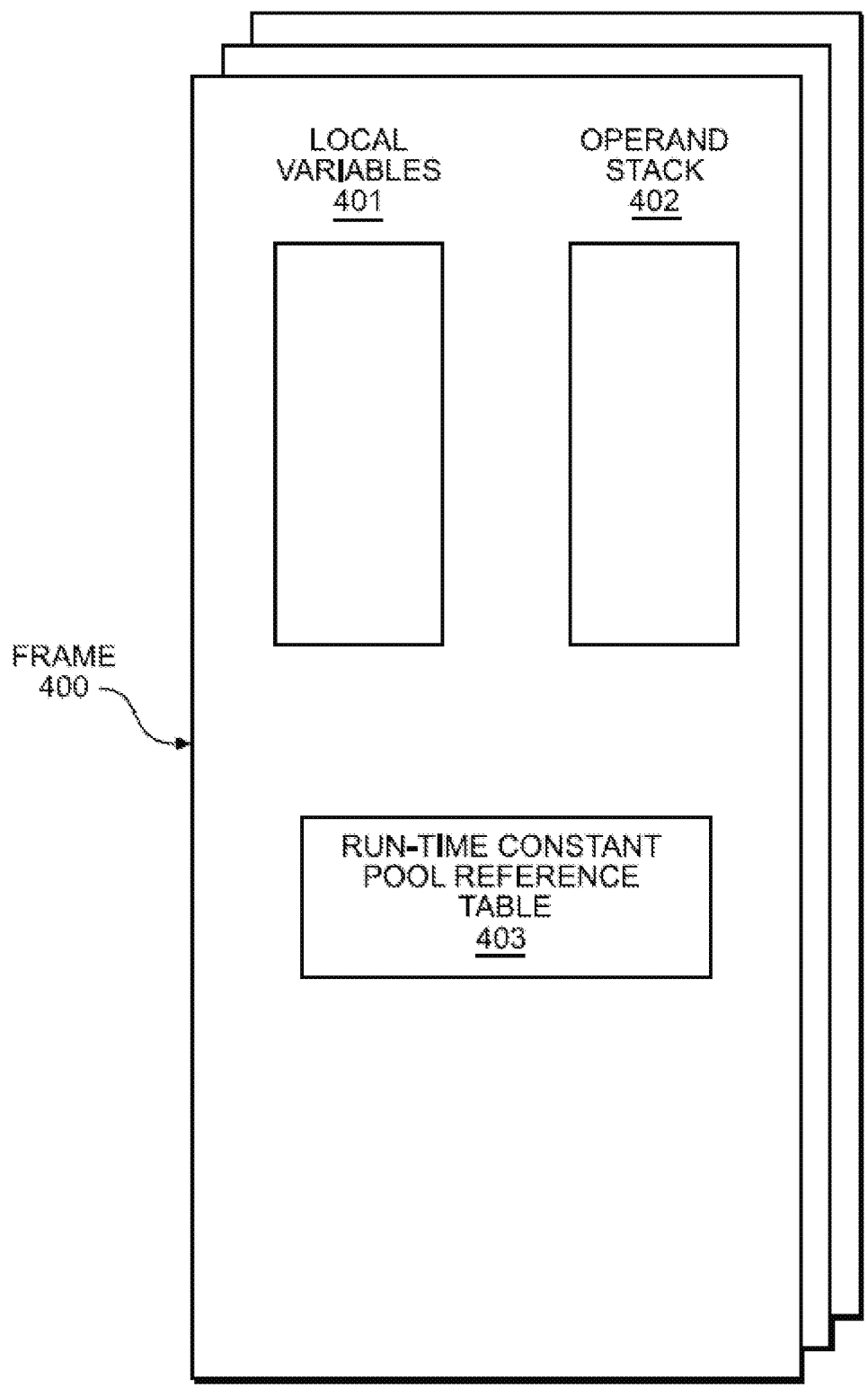
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, loading may include creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments, the steps may be interleaved such that an initial class is loaded. Then, during linking, a second class is loaded to resolve a symbolic reference found in the first class that in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 that loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. CRYPTOGRAPHIC ASSESSMENT SYSTEM

Figure 5:
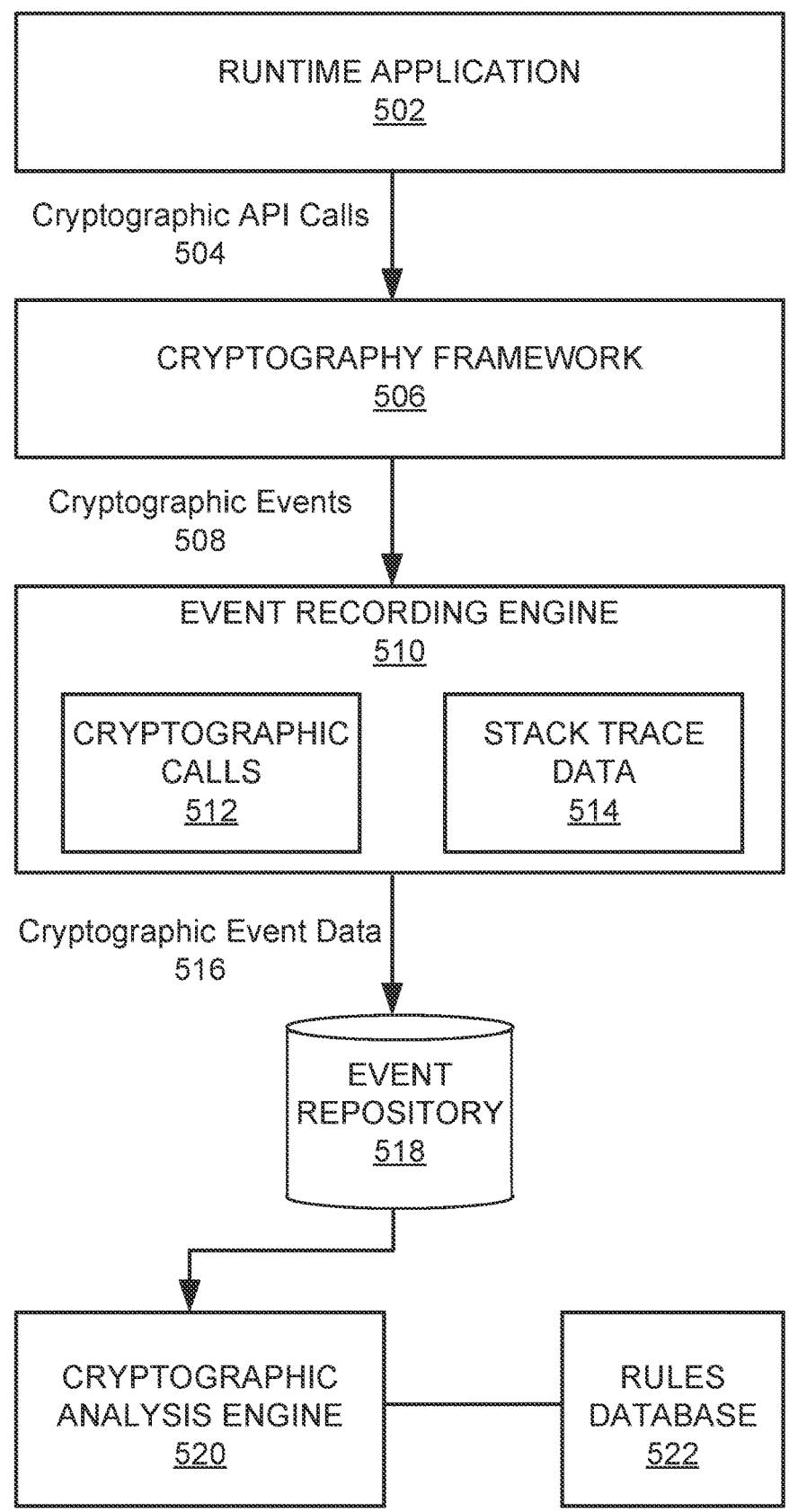
FIG. 5 illustrates a cryptographic assessment system for evaluating cryptographic application programming interface (API) calls in accordance with one or more embodiments.

FIG. 5 illustrates a cryptographic assessment system 500 in accordance with one or more embodiments. The cryptographic assessment system 500 is a system that is designed to detect and analyze cryptographic API calls corresponding to a Cryptographic Architecture API made by a target application at runtime. Analyzing a cryptographic API call includes evaluating attributes associated with a cryptographic operation identified by the cryptographic API call based on a cryptographic security ruleset. The evaluation may identify one or more rules that map to the attributes associated with a cryptographic operation. The cryptographic assessment system 500 may perform operations associated with the one or more matched rules such as generating a risk analysis metric for the cryptographic operation.

As illustrated in FIG. 5, the cryptographic assessment system 500 includes an event recording engine 510 and a cryptographic analysis engine 520. In one or more embodiments, the cryptographic assessment system 500 may include more components or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

In an embodiment, a runtime application 502 is executed. For example, the runtime application 502 may be a class file 103 executed by the execution platform 112. The runtime application 502 may perform operations that invoke various cryptographic API calls corresponding to a cryptography framework 506. The cryptography framework 506 may provide a comprehensive set of code libraries and a way to structure applications from a cryptographic perspective. The cryptographic framework 506 may provide access to various APIs, such as the Cryptographic Architecture API. The cryptography framework 506 may support cryptographic API calls for various cryptographic operations. Some example types of cryptographic operations that may be called via the cryptography framework 506 include message digests (hashing), digital signatures, symmetric and asymmetric encryption, key generation and management, key agreement protocols, message authentication codes (MAC), certificate processing, algorithm extensibility, and algorithm parameter and key specification. A cryptographic API call 504 to the cryptography framework 506 may identify a cryptographic operation and one or more arguments (or parameters) to be provided as input to the cryptographic operation. As an example, the arguments may specify an algorithm to perform the cryptographic operation and a provider that distributes an implementation of the algorithm.

In one or more embodiments, the event recording engine 510 includes hardware and/or software components for detecting and recording events. For example, the event recording engine 510 may be a tool that collects diagnostic and profiling data about a running application. As an example, the event recording engine 510 may be integrated into the virtual machine 104. The event recording engine 510 may include functionality to be always-on and continuously record event data for events that are generated in response to cryptographic API calls made by a running application.

The event recording engine 510 may include functionality to detect cryptographic events 508. The cryptographic events 508 may be generated in response to cryptographic API calls 504 to the cryptography framework 506 as made by applications at runtime. The cryptographic events 508 may be generated as runtime events by the cryptography framework 506 upon execution of application-level code corresponding to a cryptographic API call.

The event recording engine 510 may include functionality to extract (or obtain) cryptographic event data 516 associated with the cryptographic API calls. When a cryptographic event 508 corresponding to a cryptographic API call 504 is detected, the event recording engine 510 may capture cryptographic event data 516 associated with the cryptographic API call 504. For a given cryptographic event 508, the cryptographic event data 516 may include information such as an event identifier, a timestamp, a type of cryptographic operation that triggered the cryptographic event 508, an algorithm to use to apply the cryptographic operation, a provider that distributes an implementation of the algorithm, and stack trace data corresponding to the cryptographic operation, among others. The event recording engine 510 may include functionality to maintain a list of cryptographic API calls 512 that were detected as events and corresponding stack trace data 514 associated with the cryptographic API calls 512.

The event recording engine 510 may include functionality to store the cryptographic event data 516 associated with the cryptographic API calls in an event repository 518. As an example, the event repository 518 may be a file or a database where detected cryptographic events 508 and their corresponding cryptographic event data 516 is stored. In an embodiment, the event repository 518 may correspond to a binary file that can be analyzed using various tools.

In an embodiment, the cryptographic analysis engine 520 includes hardware and/or software components for evaluating cryptographic events 508 in view of a rules database 522. The cryptographic analysis engine 520 may include functionality to match cryptographic events 508 to rules in a rules database 522. The rules database 522 may be a cryptographic security ruleset that includes a plurality of rules that may be applied. A rule may be defined to evaluate a cryptographic API call for compliance with certain cryptographic security standards. For example, a cryptographic API call may be evaluated based on a rule to determine if a restricted algorithm (e.g., SHA1) is requested for performing a cryptographic operation identified by the cryptographic API call. In another example, a cryptographic API call may be evaluated based on a rule that considers information extracted from stack trace data corresponding to a cryptographic operation identified by the cryptographic API call. In general, a rule may be associated with some criteria to be satisfied that will trigger the rule. For example, a rule may specify a set of attributes for a particular cryptographic operation identified by a cryptographic API call and/or stack trace data. In this example, the rule is triggered when a cryptographic API call is made for the particular cryptographic operation using the specified set of attributes and/or stack trace data. The rules and rulesets maintained in the rules database 522 may evolve over time, for example, to reflect updates to organizational policies or industry cryptographic standards. For instance, in the event a cryptographic algorithm becomes compromised (e.g., TLS v1.2), a ruleset may be updated to restrict use of the cryptographic algorithm in runtime applications. Notably, cryptographic event data that is extracted from a runtime application at one point in time may be evaluated against new rulesets that are subsequently developed at later points in time. The new rulesets, which may be strict or non-strict, may be developed in response to evolving cryptographic standards. Thus, cryptographic event data that is extracted from a runtime application at one point in time may continue to be evaluated against future rulesets that are developed in response to new cryptographic requirements. Such evaluations may be used to generate updated cryptographic health reports that detail implications of the new cryptographic requirements on existing applications.

The cryptographic analysis engine 520 may include functionality to perform operations associated with rules that match cryptographic events 508. A rule may be associated with one or more operations to be performed when the rule is triggered. In an embodiment, a rule may be associated with an operation to determine a risk analysis metric for a cryptographic API call. When the rule is triggered in response to a cryptographic API call, the operation to determine the risk analysis metric for a cryptographic API call may be performed. The risk analysis metric may flag or classify the cryptographic API call as a safe or unsafe cryptographic operation. In general, a rule may be defined to perform any type of operation when a cryptographic API call is matched to the rule. For example, in an embodiment, a rule may be associated with an operation to modify, in real time, a code execution workflow of a cryptographic API call when the cryptographic API call is matched to the rule. As another example, a rule may be associated with an operation to deny a cryptographic operation identified by a cryptographic API call when the cryptographic API call is matched to the rule.

The cryptographic analysis engine 520 may include functionality to generate a cryptographic health report. For example, the cryptographic health report may identify cryptographic API calls made by an invoked application and corresponding risk analysis metrics determined for the cryptographic API calls. In this example, the cryptographic health report may flag each of the cryptographic API calls as a safe or unsafe cryptographic operation based on the risk analysis metrics.

4. EVALUATING A CRYPTOGRAPHIC API CALL

Figure 6:
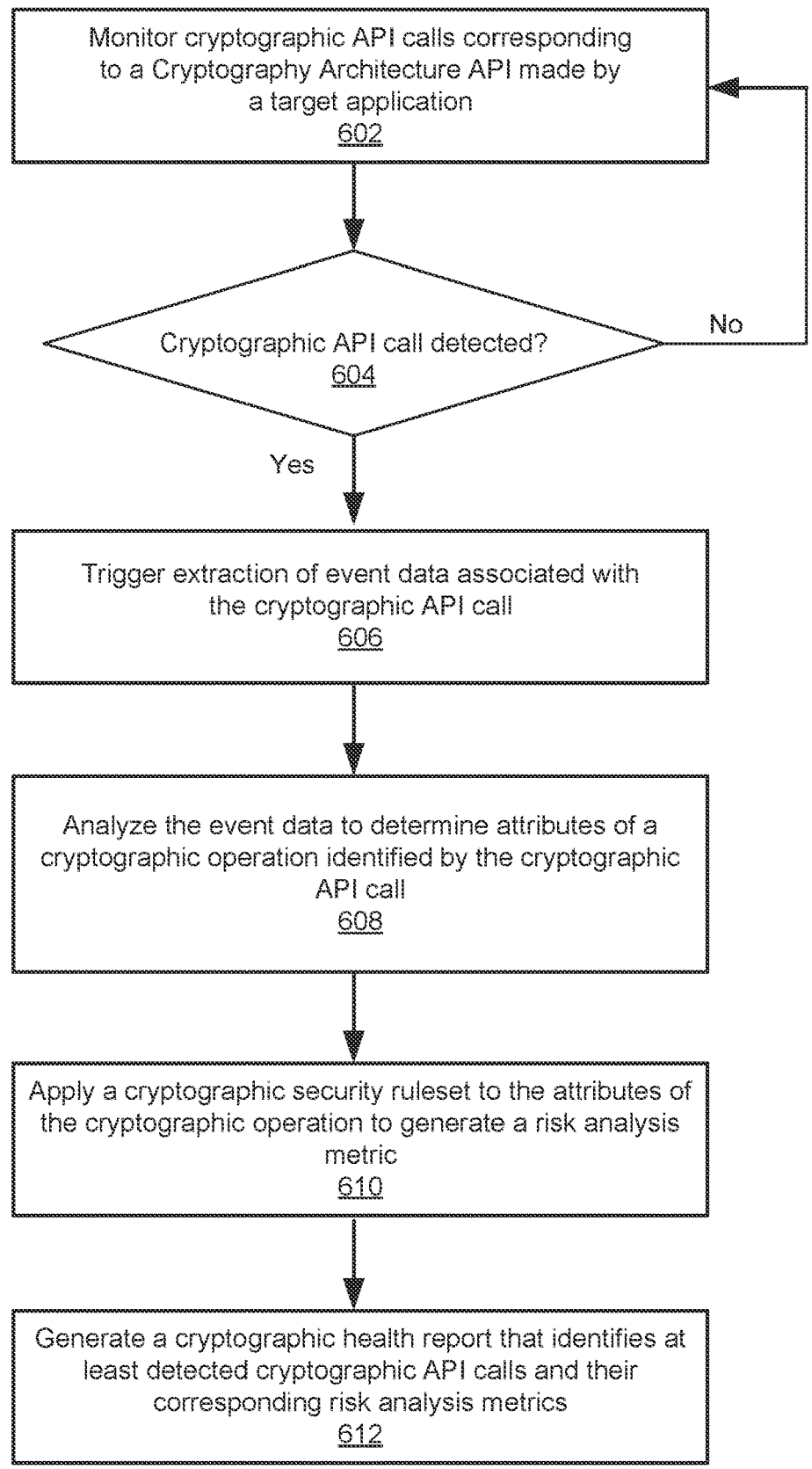
FIG. 6 illustrates an example set of operations for evaluating cryptographic API calls in accordance with one or more embodiments.

FIG. 6 illustrates a flowchart showing techniques for evaluating a cryptographic API call in accordance with one or more embodiments. One or more operations illustrated in FIG. 6 may be modified, rearranged, or omitted. Accordingly, the particular sequence of operations illustrated in FIG. 6 should not be construed as limiting the scope of one or more embodiments.

In an embodiment, the event recording engine monitors cryptographic API calls corresponding to a Cryptography Architecture API made by a target application (Operation 602). The event recording engine may be configured with an always-on setting, continuously detecting cryptographic events that are generated in response to cryptographic API calls made to the Cryptography Architecture API by the target application. The Cryptography Architecture API may provide a set of cryptographic operations (or methods) that may be called. When a cryptographic operation is invoked via a cryptographic API call to the Cryptography Architecture API, the execution of application-level code corresponding to the cryptographic operation may generate a cryptographic event. As an example, in Java, the Cryptography Architecture API may be invoked as the Java Cryptography Architecture API.

In an embodiment, the event recording engine determines whether a cryptographic API call made by the target application is detected (Operation 604). The event recording engine may determine when a cryptographic API call is detected based on a cryptographic event that is generated upon invocation of a cryptographic operation identified by the cryptographic API call. For example, the event recording engine may collect detailed runtime information, enabling insights into applications running on a virtual machine (e.g., the virtual machine 104). When an event occurs in the virtual machine, such as a method call, the event may be detected by the event recording engine through a set of built-in instrumentation points within the virtual machine. These instrumentation points are strategically placed in the virtual machine's code base to capture a wide range of runtime events. Each event type is associated with specific hooks or probes in the virtual machine, which are activated when certain actions or conditions occur. Upon the occurrence of an event, the corresponding hook in the virtual machine triggers the recording mechanism in the event recording engine. This involves collecting data relevant to the event, such as timestamps, thread information, method names, memory usage, or CPU load, depending on the nature of the event. This data is then serialized and written to an in-memory buffer allocated specifically for the event recording engine. The event recording engine operates in a non-blocking manner, meaning it is designed to minimize its impact on application performance. The data collection and buffering are handled efficiently, often in a separate thread, to ensure that an application's execution is not hindered. Once the data is captured in the buffer, it can be either written to a disk for persistent storage or kept in memory for real-time analysis. If the event recording engine does not detect a generated cryptographic event, then the event recording engine may repeat Operation 602 to continue monitoring for cryptographic API calls corresponding to the Cryptography Architecture API. That is, the event recording engine may determine that no generated cryptographic events were detected when no hooks or probes associated with events are activated at runtime.

In an embodiment, if the event recording engine detects a generated cryptographic event, then the event recording engine triggers extraction of event data associated with the cryptographic API call (Operation 606). For example, the generation of the cryptographic event may trigger a runtime event that causes the event recording engine to extract and record cryptographic event data. As discussed above, runtime events may be triggered in response to activation of hooks or probes associated with events at runtime. Upon the occurrence of the runtime event, the corresponding hook in the virtual machine triggers the recording mechanism in the event recording engine.

In an embodiment, the cryptographic analysis engine analyzes the cryptographic event data to determine attributes of the cryptographic operation identified by the cryptographic API call (Operation 608). The cryptographic analysis engine may analyze the cryptographic event data to identify attributes that were provided as input to the cryptographic operation. Attributes may correspond to pre-defined types or categories of information that can be identified and extracted from cryptographic event data. In an embodiment, the cryptographic analysis engine may analyze the cryptographic event data to determine an attribute corresponding to a type of cryptographic operation identified by the cryptographic API call. In an embodiment, the cryptographic analysis engine may analyze the cryptographic event data to determine an attribute corresponding to an algorithm (e.g., AES, RSA, SHA-256, etc.) to perform the cryptographic operation as specified by the cryptographic API call. In an embodiment, the cryptographic analysis engine may analyze the cryptographic event data to determine an attribute identifying a provider that distributes an implementation of the algorithm. For example, the provider may be some entity that provides access to APIs that can be called to use a particular algorithm to perform a cryptographic operation. Other types of attributes may be determined. For example, cryptographic analysis engine may analyze the cryptographic event data to determine a size of a cryptographic key used to perform a cryptographic operation, a mode of operation (e.g., CBC, GCM for block ciphers), data to be accessed to perform the cryptographic operation, and a user or process that initiated the cryptographic API call.

The cryptographic analysis engine may also analyze stack trace data included in the cryptographic event data to identify attributes of the cryptographic operation. The stack trace data may provide information about execution of the target application at a specific point in time that corresponds to when the cryptographic event was generated. In an embodiment, the cryptographic analysis engine may analyze the stack trace data to determine method calls that the target application was executing at that time. For example, the cryptographic analysis engine may parse the stack trace data line-by-line to identify method calls. Method calls may be recognized based on name and/or pattern matching using regular expressions, for example. The method calls may be used as attributes associated with the cryptographic operation. The list of method calls may include names of the method calls and arguments provided to the method calls. In an embodiment, the cryptographic analysis engine may analyze the stack trace data to determine a method call hierarchy. The method call hierarchy may be used as an attribute associated with the cryptographic operation. The method call hierarchy may show an ordered sequence of method calls, starting from the point when the cryptographic event was generated and going back through the sequence of method calls that led to generation of the cryptographic event.

In an embodiment, the cryptographic analysis engine applies a cryptographic security ruleset to the attributes of the cryptographic operation to generate a risk analysis metric (Operation 610). The cryptographic security ruleset may comprise a plurality of rules that can individually be applied to evaluate cryptographic operations identified by cryptographic API calls. The rules may be created based on organizational policies, compliance requirements, and cryptography best practices to address specific security needs and risks. Further, the rules may specify how different types of cryptographic API calls should be handled.

In an embodiment, each rule is associated with one or more attributes to be matched and one or more operations to be performed when the one or more attributes are matched. A rule is determined to be satisfied once a match is determined between the one or more attributes and attributes associated with a cryptographic API call. For example, in an embodiment, a rule may be defined to ensure that cryptographic operations do not use a deprecated algorithm. In this example, the rule may be associated with an attribute that identifies the deprecated algorithm. The attribute may be used to match a cryptographic API call to the rule. That is, attributes associated with the cryptographic API call may be mapped to the rule attribute that identifies the deprecated algorithm. If the cryptographic API call is associated with a matching attribute that identifies the deprecated algorithm, the cryptographic analysis engine may determine a match between the cryptographic API call and the rule. The matching between the attributes of the cryptographic API call and the rule attribute may trigger the cryptographic analysis engine to perform one or more operations that are associated with the rule.

In an embodiment, a rule may be defined to prohibit use of a certain algorithm implemented by a compromised provider. Here, the rule may be associated with a first attribute that identifies the algorithm and a second attribute that identifies the compromised provider. The attributes may be used to match a cryptographic API call to the rule. That is, attributes associated with the cryptographic API call may be mapped to the first and second rule attributes identifying the algorithm and the provider. If the cryptographic API call is associated with a matching attribute that identifies the algorithm and a matching attribute that identifies the provider, the cryptographic analysis engine may determine a match between the cryptographic API call and the rule. The matching between the attributes of the cryptographic API call and the attributes defined for the rule may trigger the cryptographic analysis engine to perform one or more operations that are associated with the rule.

In an embodiment, a rule may be defined to ensure that a certain algorithm is not used in combination with certain methods extracted from stack trace data associated with a cryptographic operation that is identified by a cryptographic API call. For example, the rule may specify that no SHA1 algorithms may be used with any keystore load or cipher calls, as identified by the stack trace data. In this example, the rule may be associated with attributes identifying the restricted calls, i.e., keystore load and cipher, and an attribute that identifies the certain algorithm, i.e., SHA1. The attributes may be used to match a cryptographic API call to the rule. That is, attributes associated with the cryptographic API call may be mapped to the attributes defined for the rule. If the cryptographic API call is associated with matching attributes identifying the restricted calls, i.e., keystore load and cipher, and the algorithm, i.e., SHA1, the cryptographic analysis engine may determine a match between the cryptographic API call and the rule. The matching between the attributes of the cryptographic API call and the attributes defined for the rule may trigger the cryptographic analysis engine to perform one or more operations that are associated with the rule.

In an embodiment, a rule may be associated with conditional logic in addition to one or more attributes and one or more operations to be performed when the rule is satisfied. As examples, the conditional logic may be defined using common conditional constructions, such as If-Then statements, If-Then-Else statements, and Else-If statements. The conditional logic may specify one or more conditions that may be evaluated as either true or false. For example, a rule may be defined to deny use of a certain algorithm (e.g., MD5) for certain cryptographic operations (e.g., message digests, digital signatures, etc.) unless use of the algorithm for the cryptographic operation is invoked by an allowed method.

In general, a rule may be associated with one or more operations to be performed once the rule is satisfied. In an embodiment, a rule may be associated with an operation to generate a risk analysis metric for a cryptographic API call that matched the rule. When the rule is matched to the cryptographic API call, the cryptographic analysis engine may determine the risk analysis metric for the cryptographic API call as defined by the rule. In an embodiment, the risk analysis metric may be defined by the rule as a flag that classifies the cryptographic API call as a safe or unsafe cryptographic operation. For example, a rule may be defined to ensure that cryptographic operations do not use a deprecated algorithm. In this example, a cryptographic API call that uses the deprecated algorithm may be associated with a risk analysis metric that flags the cryptographic API call as an unsafe cryptographic operation.

In an embodiment, a rule may be associated with an operation to allow or deny a cryptographic API call. For example, a rule may be defined to allow a cryptographic API call that requests a first version of a particular algorithm but deny a cryptographic API call that requests a second version of the algorithm. In this example, a cryptographic API call that requests the first version of the algorithm may be matched to the rule and subsequently allowed, whereas a cryptographic API call that requests the second version of the algorithm may be matched to the rule and subsequently denied.

In an embodiment, a rule may be associated with an operation to modify, in real time, a code execution workflow of a cryptographic API call. For example, a rule may be defined to identify a cryptographic API call that requests a weak cryptographic algorithm. The rule may be associated with an operation to modify, in real time, the code execution workflow, so the cryptographic API call invokes a stronger cryptographic algorithm. In this example, upon determining that a cryptographic API call matches the rule, the cryptographic analysis engine may modify, in real time, the code execution workflow, so the cryptographic API call invokes a stronger cryptographic algorithm in lieu of the weak cryptographic algorithm that was originally requested. For example, the code execution workflow of a cryptographic API call may be modified in real time based on dynamic code execution or runtime modification techniques. The modification of the code execution workflow allows changing the behavior of the target application while it is running without needing to stop, recompile, or redeploy the application.

In an embodiment, the cryptographic analysis engine generates a cryptographic health report that identifies at least detected cryptographic API calls and their corresponding risk analysis metrics (Operation 612). In an embodiment, the cryptographic health report may provide an audit of cryptographic API calls made by the target application. For example, the cryptographic health report may identify cryptographic API calls made by the target application at runtime as well as corresponding risk analysis metrics determined for the cryptographic API calls. Based on the risk analysis metrics, the cryptographic health report may identify each of the cryptographic API calls as a safe or unsafe cryptographic operation. In an embodiment, the cryptographic health report may categorize the application as a safe or unsafe cryptographic application based on the risk analysis metrics. In an embodiment, the cryptographic health report may identify cryptographic API calls made by the target application at runtime and if those cryptographic API calls were allowed or denied. In an embodiment, the cryptographic health report may identify cryptographic API calls made by the target application at runtime and any modifications to respective code execution workflows associated with the cryptographic API calls.

5. MAPPING CRYPTOGRAPHIC API CALL AND STACK TRACE TO A RULE

Figure 7:
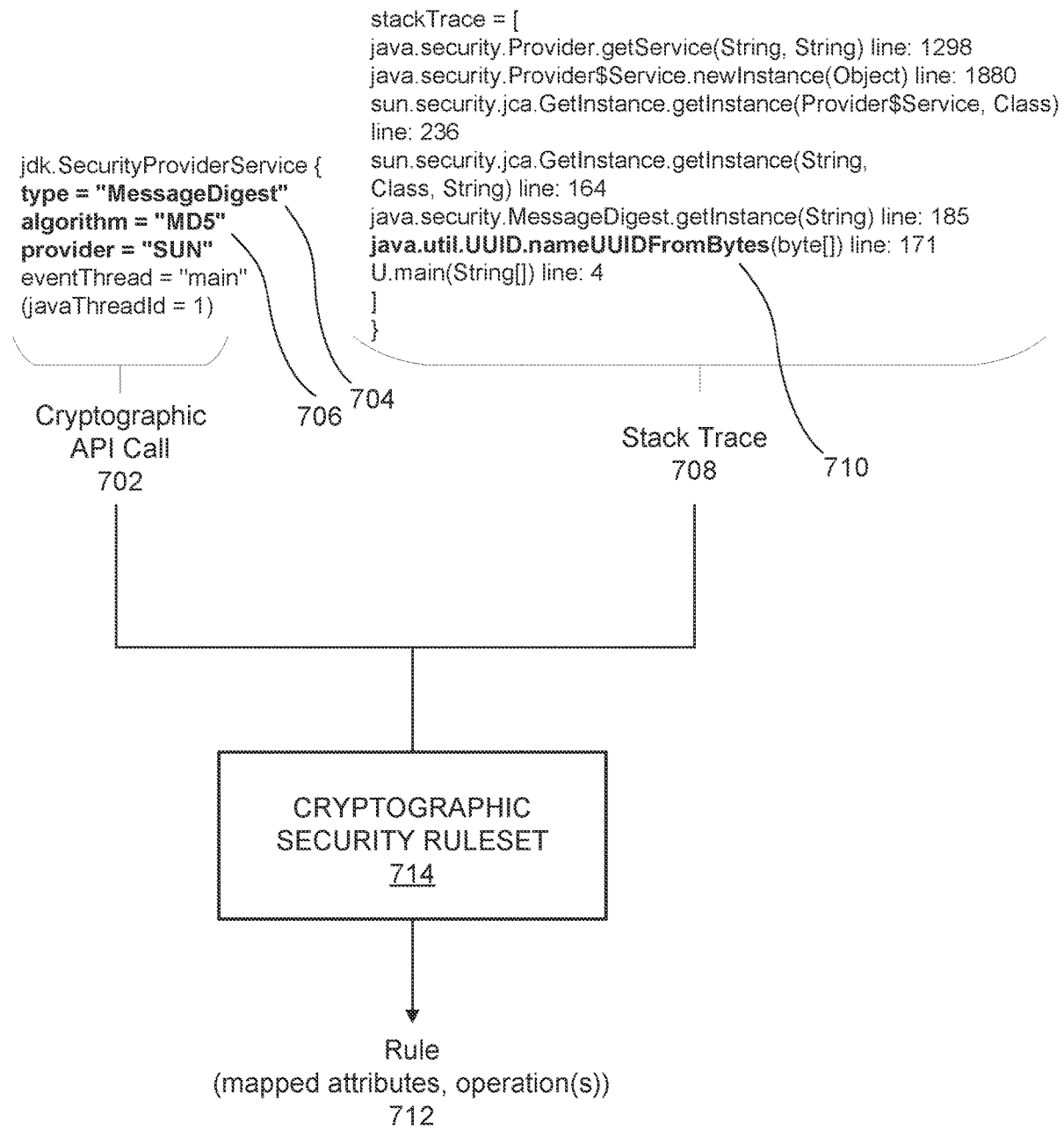
FIG. 7 illustrates an example mapping of attributes associated with a cryptographic API call to attributes associated with a rule in a cryptographic security ruleset in accordance with one or more embodiments.

FIG. 7 illustrates an example mapping of attributes associated with a cryptographic API call 702 to attributes associated with a rule 712 in a cryptographic security ruleset 714 (e.g., the rules database 522) in accordance with one or more embodiments. As shown, the cryptographic API call 702 provides event data that identifies a type of cryptographic operation 704 ("MessageDigest"), an algorithm ("MD5") 706, and a provider ("SUN"). The cryptographic API call 702 may be associated with stack trace data 708. The stack trace data 708 provides a hierarchy of method calls executed in connection with the cryptographic API call 702.

From a cryptography standards perspective, the MD5 message digest algorithm may be regarded as a weak algorithm for many cryptography applications. However, there are instances where the MD5 algorithm may be acceptable or even required. To ensure a cryptographic API call is processed in accordance with such cryptography standards, the rule 712 may be defined to distinguish between cryptographic API calls that request the MD5 message digest algorithm based on if the methods invoking the MD5 message digest algorithm are approved or restricted. Accordingly, in this example, the rule 712 included in the cryptographic security ruleset 714 may be defined to generally prohibit MessageDigest cryptographic operations using the MD5 algorithm unless such operations are invoked by one or more allowed methods such as the "java.util.UUID.nameUUIDFromBytes" method.

When the cryptographic API call 702 is detected, the cryptographic assessment system may extract event data associated with the cryptographic API call 702. The event data may be extracted from an in-memory buffer to which the event recording engine captures and records information that was collected in response to triggered events. The event data may also be extracted from respective stack trace data associated with the triggered events. The extracted event data may include attributes provided by the cryptographic API call 702, such as the cryptographic operation 704 along with the algorithm 706 and the provider. The extracted event data may also include attributes extracted from the stack trace data 708 associated with the cryptographic API call 702. The stack trace data 708 identifies method calls executed in connection with the cryptographic API call 702. The cryptographic assessment system may parse the stack trace data 708 to determine the method calls that were executed in connection with the cryptographic API call 702. In this example, the cryptographic assessment system determines that the "java.util.UUID.nameUUIDFromBytes" method 710 was called, among others.

The cryptographic assessment system may determine if the cryptographic API call 702 matches the rule 712. That is, the cryptographic assessment system may match attributes determined for the cryptographic API call 702 to attributes associated with the rule 712. In this example, the attributes of the cryptographic API call 702 identify the "MessageDigest" cryptographic operation 704, the "MD5" algorithm 706, the provider "SUN", and a list of methods invoked as extracted from the stack trace data 708. The rule 712 may be associated with attributes identifying the "MessageDigest" cryptographic operation 704 and the "MD5" algorithm. The rule 712 may also be associated with an operation that either permits or denies the cryptographic operation 704 depending on whether or not the cryptographic operation 704 was called by an approved method (e.g., "java.util.UUID.nameUUIDFromBytes"). The cryptographic assessment system may evaluate the attributes associated with the cryptographic API call 702 with respect to the attributes associated with the rule 712. Here, the cryptographic assessment system determines that the cryptographic API call 702 matches the rule 712 based on a correspondence between the "MessageDigest" cryptographic operation 704 and the "MD5" algorithm 706 attributes. In response, the cryptographic assessment system may determine if the list of methods extracted from the stack trace data 708 includes any allowed methods. In this example, the list of methods extracted from the stack trace data 708 includes an allowed method "java.util.UUID.nameUUIDFromBytes" 710. Accordingly, the cryptographic assessment system permits the cryptographic operation 704 identified by the cryptographic API call 702 to execute. In this example, if the list of methods extracted from the stack trace data 708 did not include an allowed method, the cryptographic assessment system would deny the cryptographic operation 704.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
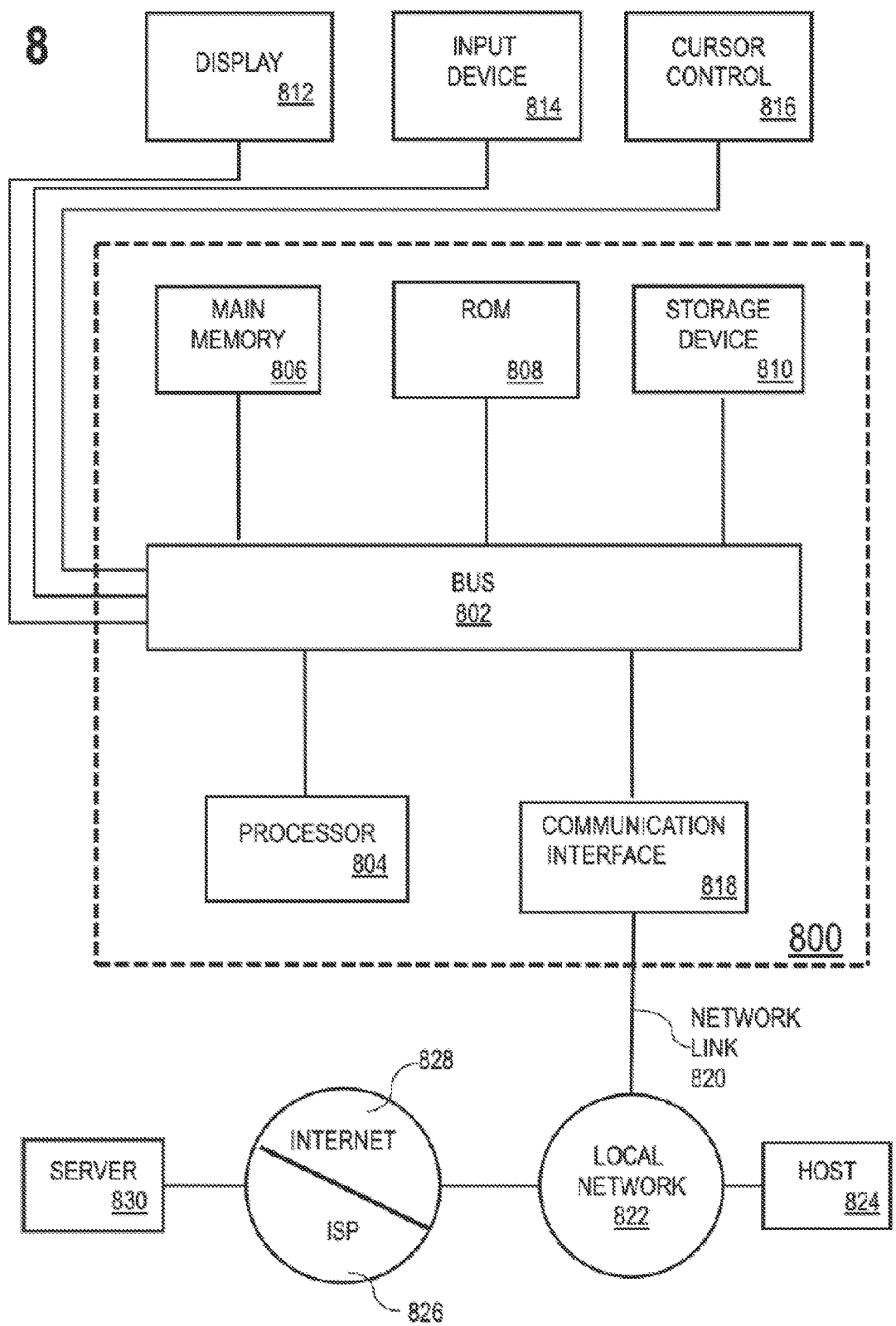
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    monitoring, at runtime, data packet transmissions including cryptographic Application Programming Interface (API) calls corresponding to a Cryptography Architecture API;
    based on the monitoring of the data packet transmissions, identifying a cryptographic API call of the cryptographic API calls;
    mapping the cryptographic API call to corresponding stack trace data;
    determining a list of method API calls made in relation to a cryptographic operation at least by traversing the stack trace data corresponding to the cryptographic API call;
    determining a list of method API calls made in relation to a cryptographic operation at least by traversing stack trace data corresponding to the cryptographic API call;
    applying a cryptographic security ruleset to (a) attributes of the cryptographic operation identified by the cryptographic API call and (b) the list of method API calls made in relation to the cryptographic operation to generate a risk analysis metric;
    generating a cryptographic health report based on the risk analysis metric; and
    executing one or more remediation actions based on the cryptographic health report.

2. The method of claim 1, wherein one or more of the attributes are identified by a stack trace that is extracted in response to detecting the cryptographic API call.

3. The method of claim 2, wherein the cryptographic API call triggers a runtime event that extracts and records the stack trace corresponding to the cryptographic API call.

4. The method of claim 1,
wherein the attributes of the cryptographic operation comprise (a) a type of cryptographic operation and (b) an algorithm to use with the type of cryptographic operation,
wherein the cryptographic security ruleset is applied to (a) the type of cryptographic operation and (b) the algorithm to generate the risk analysis metric.

5. The method of claim 1, wherein the cryptographic API call and one or more of the attributes are identified by analyzing event data published by an event recorder.

6. The method of claim 1, wherein the operations further comprise:
obtaining a stack trace associated with the cryptographic API call; and
applying the cryptographic security ruleset to the stack trace to generate the risk analysis metric.

7. The method of claim 1, wherein the operations further comprise:
selecting one or more rules from the cryptographic security ruleset at least by:
determining attributes associated with at least one of the cryptographic API call and stack trace; and
mapping the attributes to the one or more rules from the cryptographic security ruleset.

8. The method of claim 1, wherein the cryptographic health report comprises information identifying cryptographic API calls made by a target application and corresponding risk analysis metrics determined for the cryptographic API calls.

9. The method of claim 1, wherein the attributes of the cryptographic operation comprise one or more of a type of cryptographic operation, an algorithm to use with the type of cryptographic operation, a provider of the algorithm, or a stack trace corresponding to the cryptographic operation.

10. The method of claim 1, wherein the operations further comprise:
determining that the cryptographic operation identified by the cryptographic API call is unsafe based on the generated risk analysis metric; and
modifying, in real time, a code execution workflow of the cryptographic API call, wherein modifying the code execution workflow comprises at least one of:
modifying the code execution workflow to deny the cryptographic operation; or
modifying the code execution workflow to change at least one of the attributes of the cryptographic operation.

11. A system comprising:
at least one device;
wherein the system is configured to perform a set of operations comprising:
monitoring, at runtime, data packet transmissions including cryptographic Application Programming Interface (API) calls corresponding to a Cryptography Architecture API;
based on the monitoring of the data packet transmissions, identifying a cryptographic API call of the cryptographic API calls;
determining a list of method API calls made in relation to a cryptographic operation at least by traversing stack trace data corresponding to the cryptographic API call;
applying a cryptographic security ruleset to (a) attributes of the cryptographic operation identified by the cryptographic API call and (b) the list of method API calls made in relation to the cryptographic operation to generate a risk analysis metric;
generating a cryptographic health report based on the risk analysis metric; and
executing one or more remediation actions based on the cryptographic health report.

12. The system of claim 11, wherein one or more of the attributes are identified by a stack trace that is extracted in response to detecting the cryptographic API call.

13. The system of claim 12, wherein the cryptographic API call triggers a runtime event that extracts and records the stack trace corresponding to the cryptographic API call.

14. The system of claim 11, wherein the cryptographic API call and one or more of the attributes are identified by analyzing event data published by an event recorder.

15. The system of claim 11, wherein the operations further comprise:
obtaining a stack trace associated with the cryptographic API call; and
applying the cryptographic security ruleset to the stack trace to generate the risk analysis metric.

16. One or more non-transitory computer readable media comprising instructions which, when executed by one or more hardware processors, causes performance of a set of operations comprising
monitoring, at runtime, data packet transmissions including cryptographic Application Programming Interface (API) calls corresponding to a Cryptography Architecture API;
based on the monitoring of the data packet transmissions, identifying a cryptographic API call of the cryptographic API calls;
mapping the cryptographic API call to corresponding stack trace data;
determining a list of method API calls made in relation to a cryptographic operation at least by traversing the stack trace data corresponding to the cryptographic API call;
applying a cryptographic security ruleset to (a) attributes of the cryptographic operation identified by the cryptographic API call and (b) the list of method API calls made in relation to the cryptographic operation to generate a risk analysis metric;
generating a cryptographic health report based on the risk analysis metric; and
executing one or more remediation actions based on the cryptographic health report.

17. The one or more non-transitory computer readable media of claim 16, wherein one or more of the attributes are identified by a stack trace that is extracted in response to detecting the cryptographic API call.

18. The one or more non-transitory computer readable media of claim 17, wherein the cryptographic API call triggers a runtime event that extracts and records the stack trace corresponding to the cryptographic API call.

19. The one or more non-transitory computer readable media of claim 16, wherein the cryptographic API call and one or more of the attributes are identified by analyzing event data published by an event recorder.

20. The one or more non-transitory computer readable media of claim 16, wherein the operations further comprise:
obtaining a stack trace associated with the cryptographic API call; and applying the cryptographic security ruleset to the stack trace to generate the risk analysis metric.

21. The method of claim 1, wherein
determining that the cryptographic operation identified by the cryptographic API call is unsafe based on the generated risk analysis metric; and
modifying, in real time, a code execution workflow of the cryptographic API call, wherein modifying the code execution workflow comprises modifying the code execution workflow to deny the cryptographic operation.

22. The method of claim 1, wherein
determining that the cryptographic operation identified by the cryptographic API call is unsafe based on the generated risk analysis metric; and
modifying, in real time, a code execution workflow of the cryptographic API call, wherein modifying the code execution workflow comprises modifying the code execution workflow to change at least one of the attributes of the cryptographic operation.

* * * * *